(12) United States Patent
Takashiba (10) Patent No.: US 12,091,994 B2
(45) Date of Patent: Sep. 17, 2024

(54) VARIABLE VALVE TIMING SYSTEM

(71) Applicant: SUZUKI MOTOR CORPORATION, Hamamatsu (JP)

(72) Inventor: Yasuto Takashiba, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 95 days.

(21) Appl. No.: 18/155,525

(22) Filed: Jan. 17, 2023

(65) Prior Publication Data

US 2023/0250738 A1 Aug. 10, 2023

(30) Foreign Application Priority Data

Feb. 10, 2022 (JP) .................... 2022-019257

(51) Int. Cl.
*F01L 1/344* (2006.01)
*F02F 7/00* (2006.01)

(52) U.S. Cl.
CPC ... *F01L 1/3442* (2013.01); *F01L 2001/34426* (2013.01); *F02F 7/006* (2013.01); *F02F 2007/0063* (2013.01)

(58) Field of Classification Search
CPC . F01L 1/3442; F01L 1/46; F01L 1/047; F01L 2001/34426; F01L 2001/3443; F01L 2001/34433; F01P 3/207; F01P 5/10; F01P 11/0276; F01P 2003/001; F01P 2060/12; F01P 2060/04; F01P 2050/06; F02B 33/36; F01M 5/002; F02F 7/007; F02F 7/006; F02F 2007/0063

USPC ...................................... 123/90.15
See application file for complete search history.

(56) References Cited

U.S. PATENT DOCUMENTS

| | | | | |
|---|---|---|---|---|
| 6,076,492 A * | 6/2000 | Takahashi | ............ | F01L 1/02 123/90.34 |
| 8,528,389 B2 * | 9/2013 | Sato | ............ | F01L 1/46 73/114.26 |
| 11,719,137 B1 * | 8/2023 | Takashiba | ............ | F01L 1/3442 123/41.72 |
| 2018/0283243 A1 * | 10/2018 | Okada | ............ | F01M 9/105 |
| 2020/0047814 A1 * | 2/2020 | Ozeki | ............ | B62D 25/082 |

FOREIGN PATENT DOCUMENTS

JP 2020-23946 A 2/2020

* cited by examiner

*Primary Examiner* — Kenneth J Hansen
*Assistant Examiner* — Kelsey L Stanek
(74) *Attorney, Agent, or Firm* — Stein IP, LLC (57) ABSTRACT

There is provided a variable valve timing system including: an intake side camshaft and an exhaust side camshaft disposed on a cylinder head; and a variable valve device attached to one end portion of the intake side camshaft. The accommodating wall on an exhaust side of the cylinder head is positioned more inward in a vehicle width direction than the accommodating wall on an intake side of the cylinder head. A first bolt for fixing the intake side of the cylinder head to a cylinder is disposed more inward in the vehicle width direction than the accommodating wall on the intake side. A second bolt for fixing the exhaust side of the cylinder head to the cylinder is disposed more outward in the vehicle width direction than the accommodating wall on the exhaust side.

6 Claims, 10 Drawing Sheets

FIG. 10

VARIABLE VALVE TIMING SYSTEM

CROSS-REFERENCE TO RELATED APPLICATIONS

This application is based on Japanese Patent Application No. 2022-019257 filed on Feb. 10, 2022, the contents of which are incorporated herein by way of reference.

TECHNICAL FIELD

The present invention relates to a variable valve timing system.

BACKGROUND

For an object of high output, low fuel consumption, and low exhaust gas, a variable valve timing system is employed, which controls an opening and closing timing of a valve by a variable valve device according to an operation state of an engine. As a variable valve timing system, there is a system in which a variable valve device is attached to one end portion of an intake side camshaft (see, for example, Patent Literature 1). An outer wall of a cylinder head of Patent Literature 1 protrudes outward in a vehicle width direction to accommodate the variable valve device. The cylinder head is screwed to a cylinder, but a bolt is disposed inside the cylinder head because a tool line cannot be secured outside the protruding outer wall.

Patent Literature 1: JP2020-23946A

However, in the variable valve timing system described in Patent Literature 1, the outer wall of the cylinder head protrudes outward in the vehicle width direction, and thus a vehicle body frame expands to avoid interference with the cylinder head, which increases a size of a vehicle. In particular, the vehicle body frame narrows toward a vehicle front side, and a distance from the vehicle body frame is narrower on an exhaust side which is a front side of the cylinder head than on an intake side which is a rear side of the cylinder head.

The present invention has been made in view of such a point, and an object thereof is to provide a variable valve timing system capable of securing a tool line at the time of fixing a cylinder head to a cylinder while suppressing an increase in a size of a vehicle.

SUMMARY

There is provided a variable valve timing system for an engine in which a cylinder head on a cylinder is suspended on a vehicle body frame, the variable valve timing system including: an intake side camshaft and an exhaust side camshaft disposed on the cylinder head; and a variable valve device attached to one end portion of the intake side camshaft. In a side view of a vehicle, when a side where the intake side camshaft is disposed is defined as an intake side of the cylinder head, and a side where the exhaust side camshaft is disposed is defined as an exhaust side of the cylinder head, in accommodating walls of the cylinder head which cover the intake side camshaft and the exhaust side camshaft from a side, the accommodating wall on the exhaust side is positioned more inward in a vehicle width direction than the accommodating wall on the intake side. A first bolt for fixing the intake side of the cylinder head to the cylinder is disposed more inward in the vehicle width direction than the accommodating wall on the intake side. A second bolt for fixing the exhaust side of the cylinder head to the cylinder is disposed more outward in the vehicle width direction than the accommodating wall on the exhaust side.

DESCRIPTION OF EMBODIMENTS

A variable valve timing system according to an aspect of the present invention is mounted on an engine in which a cylinder head on a cylinder is suspended on a vehicle body frame. The variable valve timing system is provided with an intake side camshaft and an exhaust side camshaft disposed on the cylinder head, and a variable valve device attached to one end portion of the intake side camshaft. In a side view of a vehicle, when a side where the intake side camshaft is disposed is defined as an intake side of the cylinder head, and a side where the exhaust side camshaft is disposed is defined as an exhaust side of the cylinder head, in accommodating walls of the cylinder head which cover the intake side camshaft and the exhaust side camshaft from a side, the accommodating wall on the exhaust side is positioned more inward in a vehicle width direction than the accommodating wall on the intake side. A first bolt that fixes the intake side of the cylinder head to the cylinder is disposed more inward in the vehicle width direction than the accommodating wall on the intake side, and a second bolt that fixes the exhaust side of the cylinder head to the cylinder is disposed more outward in the vehicle width direction than the accommodating wall on the exhaust side. Accordingly, the accommodating wall on the intake side of the cylinder head protrudes outward in the vehicle width direction to accommodate the variable valve device, and a tool line for tightening the first bolt is secured inside the protruding accommodating wall. In addition, protrusion of the accommodating wall on the exhaust side of the cylinder head is suppressed to avoid interference with the vehicle body frame, and a tool line for tightening the second bolt is secured at an outer side of the accommodating wall whose protrusion is suppressed. Accordingly, the vehicle body frame does not expand outward in the vehicle width direction, thereby suppressing an increase in a size of the vehicle, and a tool line at the time of fixing the cylinder head to the cylinder can be secured.

EMBODIMENT

Figure 1:
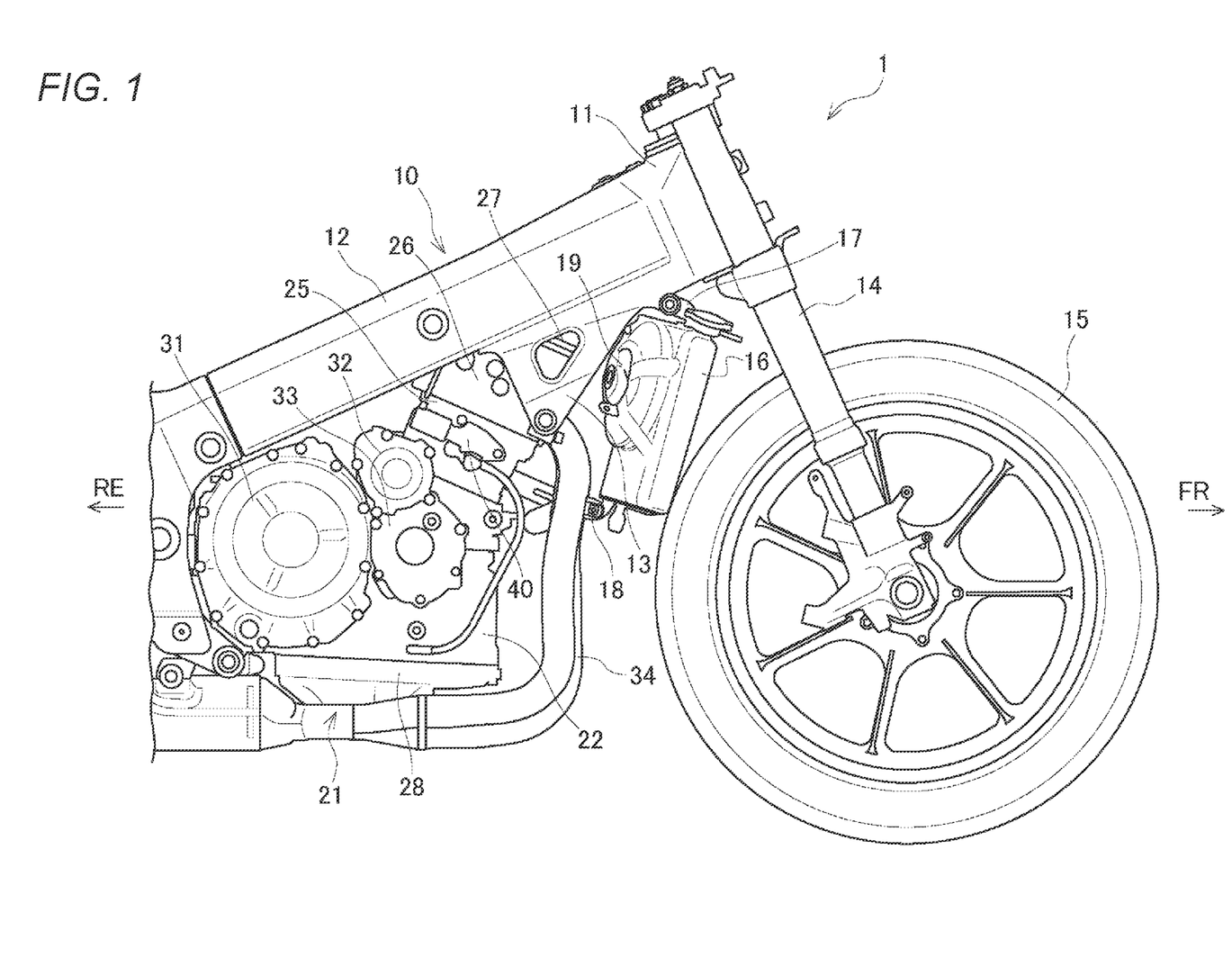
FIG. 1 is a right side view of a vehicle front portion according to the present embodiment.

Hereinafter, the present embodiment will be described in detail with reference to the accompanying drawings. FIG. 1 is a right side view of a vehicle front portion according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 21 and an electrical system that are mounted on a twin spar-type vehicle body frame 10. The vehicle body frame 10 includes a pair of main frames 12 that are branched off from a head pipe 11 to the left and right and extend rearward, and a pair of down frames 13 that extend downward from front portions of the pair of main frames 12. The pair of main frames 12 are curved so as to pass over the engine 21 and wrap around to the rear of the engine 21. An upper side and a rear side of the engine 21 are suspended by the pair of main frames 12, and a front side of the engine 21 is suspended by the pair of down frames 13.

A front fork 14 is steerably supported by the head pipe 11 via a steering shaft (not shown). A front wheel 15 is rotatably supported at a lower portion of the front fork 14. A radiator (heat exchanger) 16 that dissipates heat from cooling water of the engine 21 is provided in front of the engine 21. An upper portion of the radiator 16 is supported by the main frames via an upper bracket 17, and a lower portion of the radiator 16 is supported by the engine via a lower bracket 18. A cooling fan 19 that takes in hot air from the radiator 16 when a vehicle is stopped is attached to a rear surface of the radiator 16.

The engine 21 is a parallel 4-cylinder engine in which four cylinders are arranged in left and right directions, and includes a crankcase 22 accommodating a crankshaft (not shown). A cylinder assembly in which a cylinder 25, a cylinder head 26, and a cylinder head cover 27 are laminated is attached to an upper portion of the crankcase 22. An oil pan 28 in which oil for lubrication and cooling is stored is attached to a lower portion of the crankcase 22. Engine covers such as a clutch cover 31 and starter gear covers 32 and 33 are attached to a left side surface of the crankcase 22. A plurality of exhaust pipes 34 extend downward from a front surface of the engine 21.

The engine 21 is mounted with a hydraulically controlled variable valve timing system that controls an opening and closing timing of an intake valve (not shown). A variable valve device 60 (see FIG. 9) is accommodated inside the cylinder head 26 and the cylinder head cover 27, and an oil control valve 40 is disposed on an outer surface of the cylinder 25. The variable valve device 60 and the oil control valve 40 are connected through various oil paths in the engine 21. The oil control valve 40 controls a hydraulic pressure with respect to the variable valve device 60, so that the opening and closing timing of the intake valve is changed according to the hydraulic pressure with respect to the variable valve device 60.

The cylinder head is screwed to the cylinder with a bolt, but if the engine is not mounted with the variable valve timing system, the bolt is disposed at an outer side of the cylinder head to secure a tool line for tightening the bolt. On the other hand, in the engine mounted with the variable valve timing system, an outer wall of the cylinder head protrudes outward in the vehicle width direction to accommodate the variable valve device, and a tool line for tightening the bolt at the outer side of the cylinder head cannot be secured. Therefore, the bolt is usually disposed inside the cylinder head to secure the tool line.

However, when the outer wall of the cylinder head protrudes outward in the vehicle width direction as a whole, the vehicle body frame expands outward in the vehicle width direction to avoid interference with the cylinder head, which increases a size of the vehicle. In particular, the vehicle body frame narrows toward the vehicle front side, and the exhaust side which is a front side of the cylinder head easily interferes with the vehicle body frame. Here, in the cylinder head 26 according to the present embodiment, an outer wall on the intake side protrudes outward in the vehicle width direction to accommodate the variable valve device 60, protrusion of an outer wall on the exhaust side is suppressed, and expansion of the vehicle body frame 10 is suppressed. Bolts are disposed at an inner side of the outer wall on the intake side and at the outer side of the outer wall on the exhaust side to secure tool lines for tightening the bolts.

Figure 2:
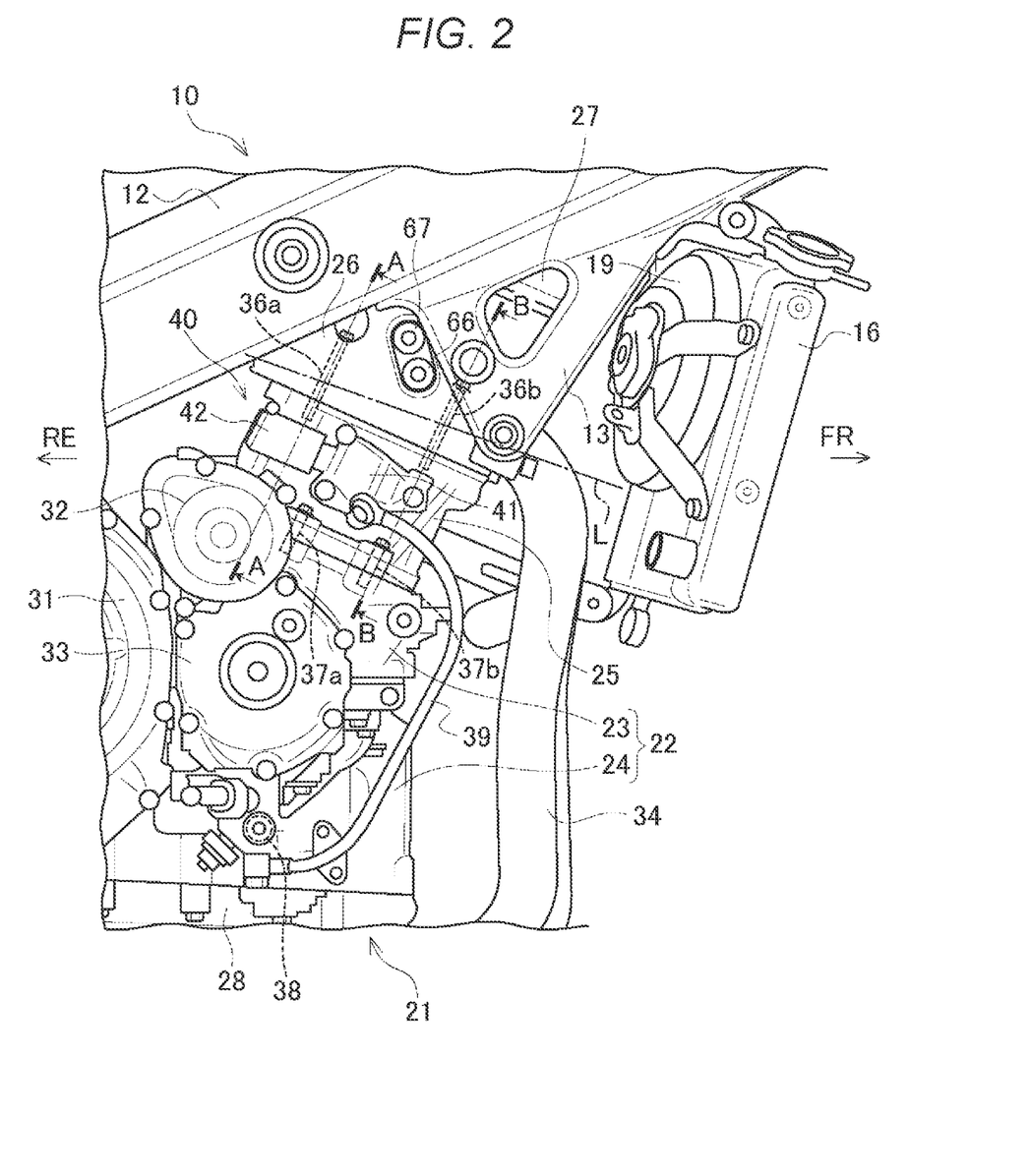
FIG. 2 is a right side view of the periphery of an engine according to the present embodiment.
Figure 3:
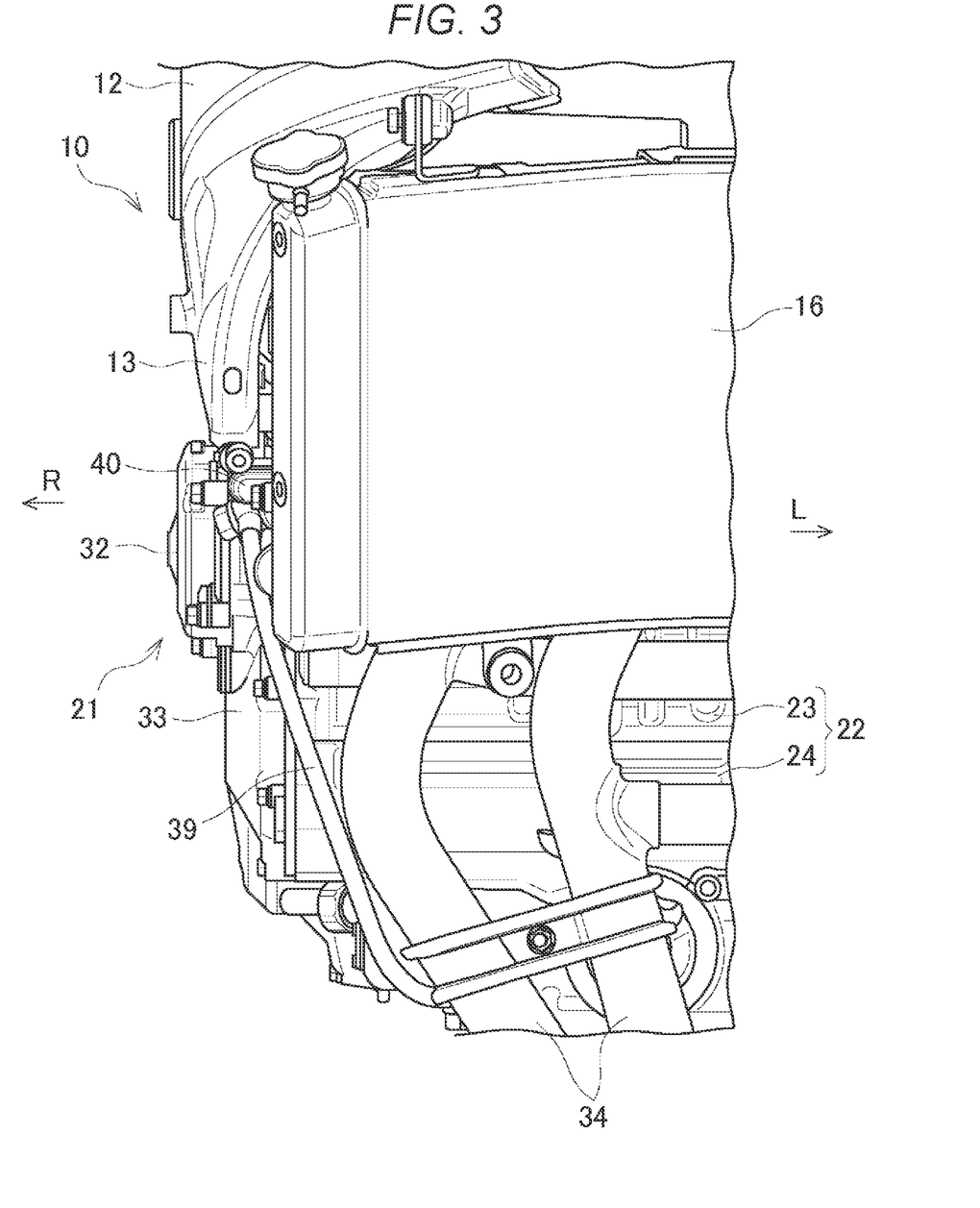
FIG. 3 is a front view of the periphery of the engine according to the present embodiment.

A layout of the oil control valve will be described with reference to FIG. 2 and FIG. 3. FIG. 2 is a right side view of the periphery of the engine according to the present embodiment. FIG. 3 is a front view of the periphery of the engine according to the present embodiment.

As shown in FIG. 2, the crankcase 22 of the engine 21 has a vertically divided structure including an upper case 23 and a lower case 24. Various shafts such as a crankshaft are supported by a mating surface between the upper case 23 and the lower case 24. The oil pan 28 is fixed to a lower surface of the lower case 24 and the cylinder 25 is fixed to an upper surface of the upper case 23. The cylinder head 26 is fixed to an upper surface of the cylinder 25, and the cylinder head cover 27 is fixed to an upper surface of the cylinder head 26. The cylinder head 26 and the crankcase 22 are suspended on the vehicle body frame 10.

A front portion of the vehicle body frame 10 branches into the main frames 12 and the down frames 13. The main frame 12 obliquely crosses a side of the cylinder head 26 from the upper surface to a rear surface, and the down frame 13 is formed in a substantially triangular shape in a side view such that a front-to-rear width narrows downward. The main frame 12 laterally covers a rear side of the cylinder head 26, and the down frame 13 laterally covers a front side of the cylinder head 26. The rear side of the cylinder head 26 is suspended on a middle portion of the main frame 12 in an extension direction, and the front side of the cylinder head 26 is suspended on a lower head portion of the down frame 13.

A triangular area surrounded by a lower edge of the main frame 12, a rear edge of the down frame 13, and a lower surface of the cylinder head 26 is formed on a side surface of the cylinder head 26 in a side view of the vehicle. Although the triangular area of the cylinder head 26 is exposed to the side from between the main frame 12 and the down frame 13, the triangular area is not wide enough for the oil control valve 40. Therefore, the oil control valve is disposed on a side surface (outer surface) of the cylinder 25 below the triangular area of the cylinder head 26. The side surface of the cylinder 25 is formed by an outer wall of a cam chain chamber 58 (see FIG. 6).

A pair of plug caps 66 and 67 that close insertion openings for a pair of oil pipes 64 and 65 (see FIG. 5) which will be described later are disposed in the triangular area of the cylinder head 26. Since the plug caps 66 and 67 avoid the vehicle body frame 10 in the side view of the vehicle, the oil pipes 64 and 65 can be attached and detached through the plug caps 66 and 67 even when the engine 21 is suspended on the vehicle body frame 10, and the maintainability is improved. Since the plug caps 66 and 67 are disposed along the rear edge of the down frame 13, there is no need to modify a shape of the down frame 13. In this case, the plug cap 67 at the vehicle rear side is positioned higher than the plug cap 66 at the vehicle front side, and the plug caps 66 and 67 are partially overlapped with each other in an up-down direction, so that a disposing area of the plug caps 66 and 67 is narrowed.

The oil control valve 40 is formed in a substantially cylindrical shape by a valve housing 41 in which a valve spool (not shown) is accommodated and a solenoid 42 that advances and retracts the valve spool. The oil path in the oil control valve 40 is switched by advancing and retracting the valve spool by the solenoid 42. The oil control valve 40 is tilted such that an axial direction of the oil control valve 40 is parallel to a mating surface between the cylinder head 26 and the cylinder 25. The solenoid 42 is provided on a rear side of the valve housing 41 and positioned above the valve housing 41.

A contamination such as metal powder may occur inside the valve housing 41, but it is difficult for the contamination to enter the solenoid 42 from the valve housing 41. That is, since the oil control valve 40 is tilted such that the solenoid 42 is located higher than the valve housing 41, the contamination is suppressed from being transferred from the valve housing 41 to the solenoid 42 by the oil. Since the contamination does not accumulate on a solenoid 42 side, damage to the oil control valve 40 due to the contamination is suppressed. Details of the oil control valve 40 will be described later.

Since the oil control valve 40 is disposed on the outer surface of the cylinder 25, the oil control valve 40 does not interfere with the vehicle body frame 10 on which the cylinder head 26 is suspended. Therefore, the vehicle body frame 10 does not protrude outward in the vehicle width direction, and an increase in a size of the straddle-type vehicle 1 is suppressed. Since the center of gravity of the engine 21 is located in the crankcase 22, the oil control valve is brought close to the center of gravity of the engine 21. Therefore, transmission of vibration from the crankcase 22 to the oil control valve 40 is reduced, and the durability of the oil control valve 40 is improved.

In the side view of the vehicle, the cylinder head 26 and the cylinder 25 are fixed by first and second bolts 36a and 36b on both sides of a cylinder axis, and the cylinder 25 and the crankcase 22 are fixed by third and fourth bolts 37a and 37b on the both sides of the cylinder axis. In this case, an interval between the first and second bolts 36a and 36b is wider than an interval between the third and fourth bolts 37a and 37b, and the oil control valve 40 is positioned close to the cylinder head 26. The oil control valve 40 is disposed so as not to overlap with the first to fourth bolts 36a, 36b, 37a, and 37b.

In particular, the oil control valve 40 is positioned below the down frames 13, and a part of the oil control valve 40 is positioned below the second bolt 36b. Accordingly, in order to avoid interference between the second bolt 36b and the oil control valve 40, the oil control valve 40 is not required to protrude outward in the vehicle width direction, and an increase in a size of the engine 21 is suppressed. The oil control valve 40 is disposed at the cylinder 25, so that the vehicle body frame 10 is separated from the oil control valve 40, the degree of freedom in a shape of the vehicle body frame 10 is improved, and the vehicle body frame 10 does not expand outward in the vehicle width direction, thereby suppressing the increase in the size of the vehicle.

The starter gear covers 32 and 33 that laterally cover starter gears (not shown) are provided below the oil control valve 40. The clutch cover 31 that laterally covers a clutch (not shown) is provided behind the starter gear covers 32 and 33. An upper portion of the starter gear cover 32 protrudes toward the cylinder 25, but interference between the starter gear cover and the solenoid 42 is suppressed. The starter gear covers 32 and 33 and the clutch cover are formed as separate engine covers, but the starter gear covers 32 and 33 and the clutch cover 31 may be formed as one engine cover.

As shown in FIGS. 2 and 3, the starter gear covers 32 and 33 and the clutch cover 31 bulge more outward in the vehicle width direction than the side surface of the cylinder 25. In a front view of the vehicle, the oil control valve 40 is positioned more inward in the vehicle width direction than the starter gear covers 32 and 33, the clutch cover 31, and the down frames 13. The oil control valve 40 is positioned between the starter gear covers 32 and 33 and the down frames 13. The oil control valve 40 is protected by the starter gear covers 32 and 33, the clutch cover 31, and the down frames 13 when the vehicle overturns.

A main gallery 38 of the oil is formed in the crankcase 22, and the main gallery 38 and the oil control valve 40 are connected by an external pipe 39. Accordingly, the oil is directly supplied to the oil control valve 40 from the main gallery 38 with high hydraulic pressure through the external pipe 39. The oil is supplied from the main gallery 38 to the oil control valve 40 without passing through the oil path in the crankcase 22, so that pressure loss in the oil path is reduced, and the oil with high hydraulic pressure can be supplied to the oil control valve 40.

The external pipe 39 extends forward of the vehicle from the main gallery 38, wraps around the crankcase 22 from below, and extends upward. The external pipe 39 is bent toward the rear of the vehicle below the down frame 13 and connected to the valve housing 41 of the oil control valve 40. In the front view of the vehicle, the external pipe 39 passes more inward in the vehicle width direction than the starter gear covers 32 and 33, the clutch cover 31, and the down frames 13, and is connected to the oil control valve 40 below the down frames 13. The external pipe 39 is protected by the starter gear covers 32 and 33, the clutch cover 31, and the down frames 13 when the vehicle overturns.

The radiator 16 having a rectangular shape in the front view is provided in front of the cylinder head 26. The radiator 16 is tilted such that the upper portion is located forward of the lower portion. The radiator 16 is a round radiator curved into an arch shape in a top view, and the cooling fan 19 is attached to the rear surface of the radiator 16 on an oil control valve side (right side) in the vehicle width direction. In the front view of the vehicle, the oil control valve 40 is disposed more outward in the vehicle width direction than the radiator 16 and below the down frame 13, and it is difficult for the radiator 16 and the down frames 13 to block running wind in front of the oil control valve 40.

Since the oil control valve 40 is a solenoid valve, the oil control valve 40 is likely to generate heat when the solenoid 42 is energized. Therefore, the oil control valve 40 is cooled by the running wind, so that deterioration of operability of the variable valve device 60 due to temperature rise of the oil control valve 40 and the oil is suppressed. As described above, the solenoid 42 is positioned at the rear side of the valve housing 41, and the solenoid 42 is separated from the radiator 16. The heat from the radiator 16 is less likely to be transmitted to the solenoid 42, and temperature rise of the solenoid 42 is suppressed.

In the side view of the vehicle, a lower end of the down frame 13 is positioned on an extension line L extending from a lower end of the cooling fan 19 in a blowing direction, and the oil control valve 40 is positioned below the extension line L. Exhaust air from the radiator is less likely to hit the oil control valve 40, and the deterioration of the operability of the variable valve device 60 due to the temperature rise of the oil control valve 40 and the oil is suppressed. In the front view of the vehicle, the solenoid 42 of the oil control valve 40 is covered by the down frames 13, and the exhaust air from the radiator 16 is blocked by the down frames 13 to suppress the temperature rise of the solenoid 42.

Figure 4A:
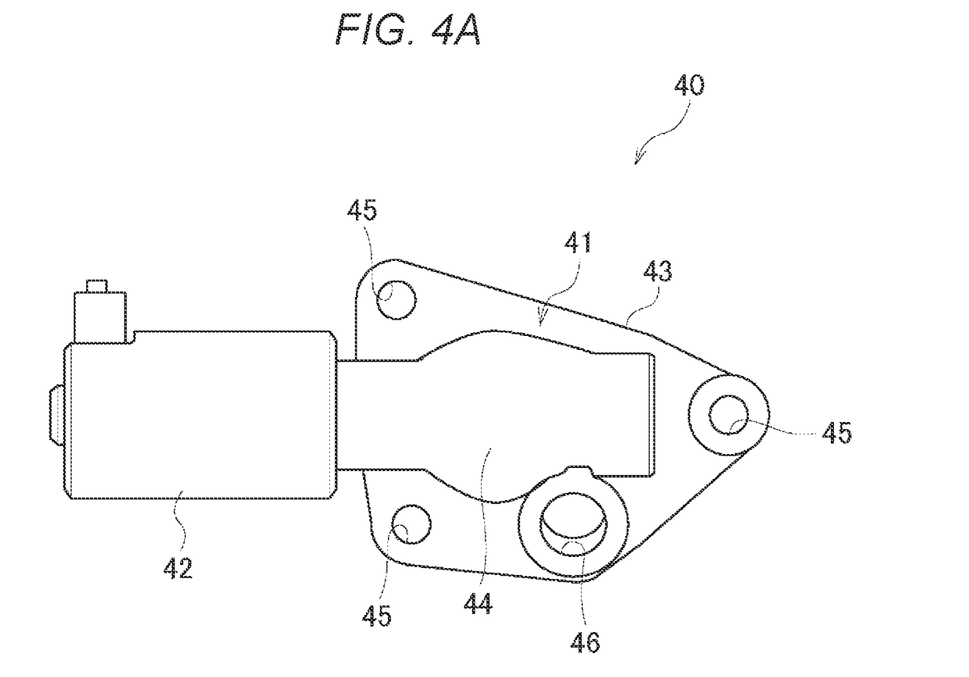
FIG. 4A and FIG. 4B are front and rear views of an oil control valve according to the present embodiment.
Figure 4B:
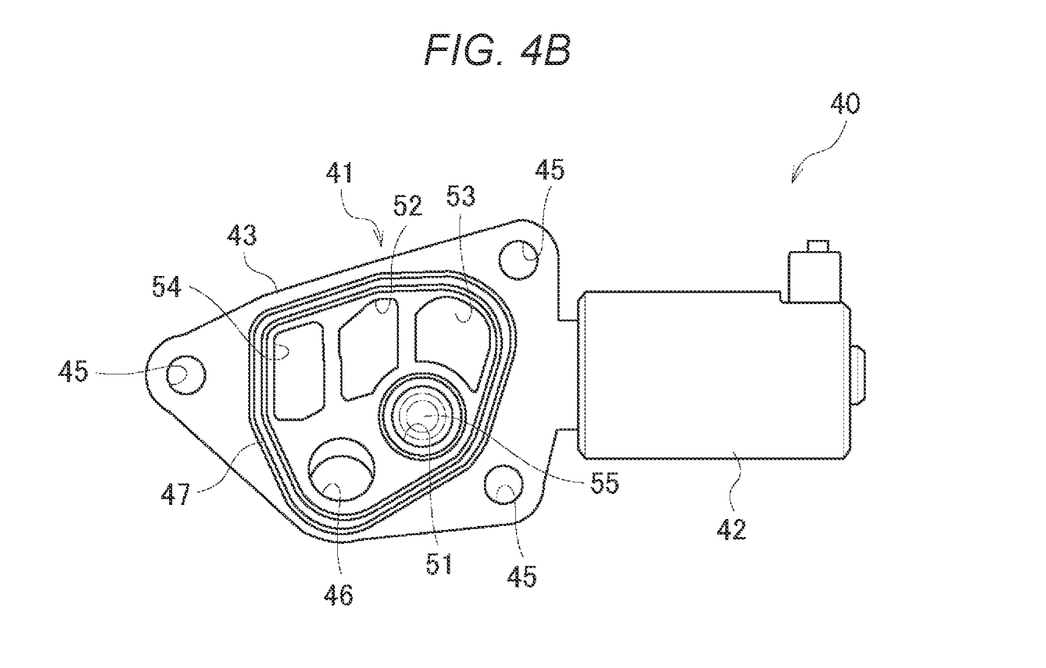

The oil control valve will be described with reference to FIG. 4A and FIG. 4B. FIG. 4A and FIG. 4B are front and rear views of the oil control valve according to the present embodiment. FIG. 4A shows the front view of the oil control valve, and FIG. 4B shows the rear view of the oil control valve.

As shown in FIG. 4A and FIG. 4B, the valve housing 41 of the oil control valve 40 includes a disposing plate 43 disposed on the side surface of the cylinder 25, and a cylindrical case 44 bulging outward from the disposing plate 43. Three fixing holes 45 for screwing are formed in an outer edge of the disposing plate 43 so as to surround the cylindrical case 44. A supply port 46 to which the external pipe 39 (see FIG. 2) is connected is formed in a lower portion of the disposing plate 43. The valve spool extending from the solenoid 42 is inserted into the cylindrical case 44. A destination of the oil entering from the supply port 46 is switched by the valve spool.

An O-ring 47 that seals a gap between a rear surface of the disposing plate 43 and the side surface of the cylinder 25 is attached to the rear surface of the disposing plate 43. The supply port 46, an input port 51, an advance port 52, a retard port 53, and a drain port 54 are formed inside the O-ring 47. The supply port 46 communicates with the input port 51 through the oil path formed in the cylinder 25. A filter 55 is disposed in the input port 51, and the oil is filtered by passing through the filter 55. The input port 51 communicates with any one of the advance port 52, the retard port 53, and the drain port 54 depending on a position of the valve spool.

When the oil enters the input port 51 from the supply port 46, the oil filtered by the filter 55 of the input port 51 is input to the cylindrical case 44. By moving the valve spool by the solenoid 42, the input port 51 is communicated with either the advance port 52 or the retard port 53, and the drain port 54 is communicated with the other of the advance port 52 and the retard port 53. Accordingly, the oil is supplied from the oil control valve 40 toward either an advance chamber S1 or a retard chamber S2 of the variable valve device 60 (see FIG. 10) which will be described later, and the excess oil is discharged toward the oil control valve 40 from the other of the advance chamber S1 and the retard chamber S2.

Figure 5:
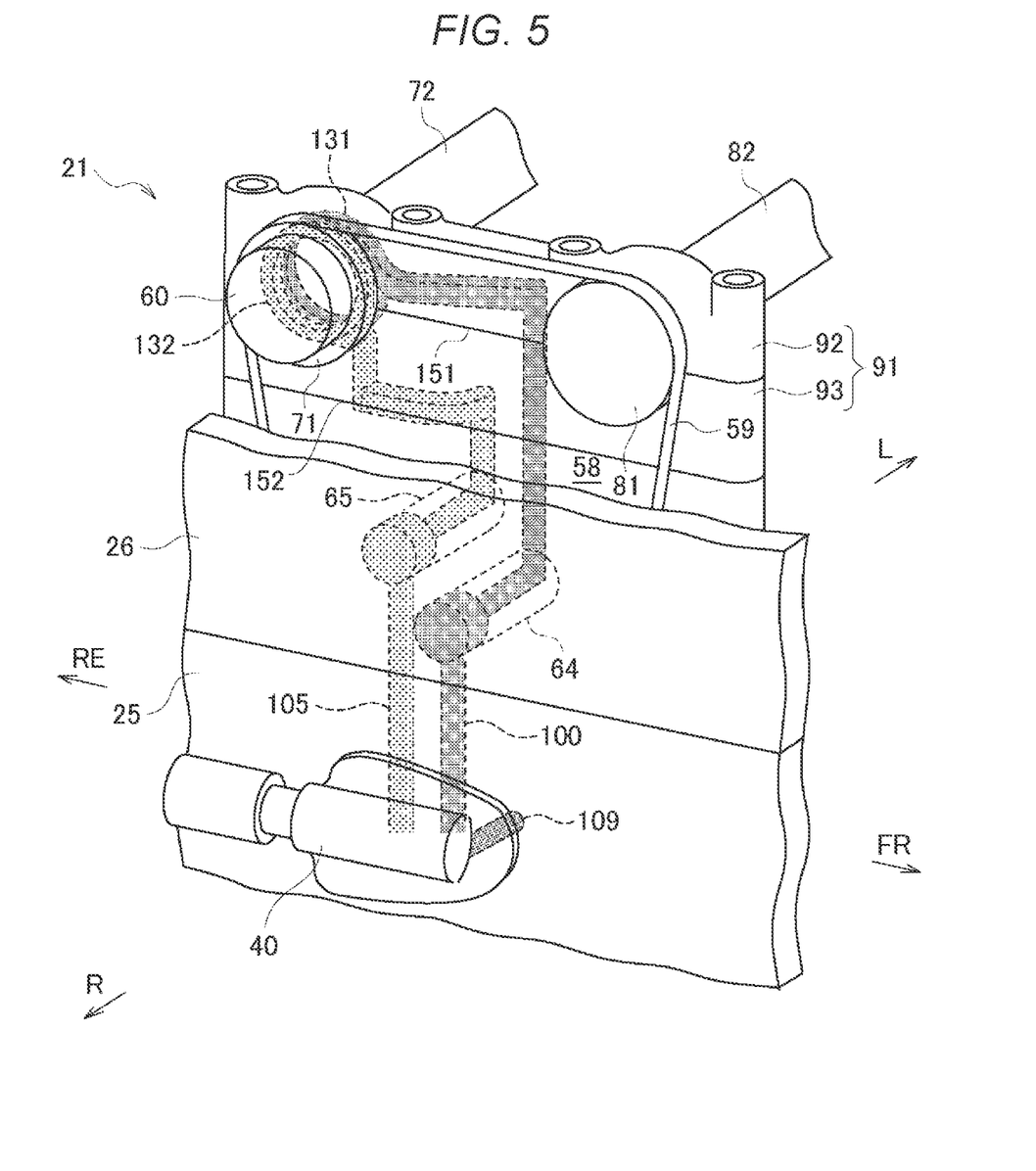
FIG. 5 is a schematic view of an oil path according to the present embodiment.

The oil path in the engine will be described with reference to FIG. 5. FIG. 5 is a schematic view of the oil path according to the present embodiment.

As shown in FIG. 5, the cam chain chamber 58 is formed in the cylinder 25 and cylinder head 26 of the engine 21. A cam chain 59 is accommodated in the cam chain chamber 58, and the cam chain 59 is stretched over an intake side cam sprocket 71 and an exhaust side cam sprocket 81. An intake side camshaft 72 is fixed to the intake side cam sprocket 71, and an exhaust side camshaft 82 is fixed to the exhaust side cam sprocket 81. The crankshaft (not shown) is connected to the intake side camshaft 72 and the exhaust side camshaft 82 via the cam chain 59.

The intake side camshaft 72 and the exhaust side camshaft 82 are rotatably supported by a cam housing 91. The cam housing 91 is a support wall fixed on the cylinder head 26, and includes an upper housing 92 that supports upper half portions of the camshafts 72 and 82 and a lower housing 93 that supports lower half portions of the camshafts 72 and 82.

The variable valve device 60 is attached to one end portion of the intake side camshaft 72 inside the cylinder head 26. The variable valve device 60 advances or retards the intake side camshaft 72 according to the hydraulic pressure to change the opening and closing timing of the intake valve (not shown).

The oil control valve 40 is disposed on the outer surface (side surface) of the cylinder which is the outer wall of the cam chain chamber 58. The oil control valve 40 controls the hydraulic pressure with respect to the variable valve device 60. An advance path 100 extends from the advance port 52 (see FIG. 4B) of the oil control valve 40 toward the variable valve device 60, and a retard path 105 extends from the retard port 53 (see FIG. 4B) of the oil control valve 40 toward the variable valve device 60. The oil for advancing the opening and closing timing of the intake valve passes through the advance path 100, and the oil for retarding the opening and closing timing of the intake valve passes through the retard path 105.

The advance path 100 and the retard path 105 for the hydraulic pressure control enter the outer wall of the cam chain chamber 58 from the oil control valve 40. The advance path and the retard path 105 are oriented from a cylinder 25 side to a cylinder head 26 side, then cross the cam chain chamber 58 toward the variable valve device 60 through an inner wall of the cam chain chamber 58. In this case, the outer wall of the cam chain chamber 58 is formed by an outer wall of the cylinder 25, an outer wall of the cylinder head 26, and an outer wall of the crankcase 22, and the inner wall of the cam chain chamber 58 is formed by an inner wall of the cylinder 25, an inner wall of the cylinder head 26, an inner wall of the crankcase 22, and the cam housing 91.

The outer wall and the inner wall of the cylinder head 26 are connected by the pair of oil pipes 64 and 65. The pair of oil pipes 64 and 65 cross the cam chain chamber 58 through the inside of the cam chain 59. Since the oil pipes 64 and 65 are detachably disposed, the pair of oil pipes 64 and 65 do not interfere when the cam chain 59 is assembled. Since the oil pipes 64 and 65 are detachable, the pair of oil pipes 64 and 65 can be inserted after the cam chain 59 is assembled to the engine 21. Accordingly, a dead space inside the cam chain 59 can be effectively utilized.

In the outer wall of the cam chain chamber 58, the advance path 100 and the retard path 105 extend from the outer wall of the cylinder 25 toward the outer wall of the cylinder head 26 in parallel with the cylinder axis. In this case, the advance path 100 is positioned on the front side and the retard path 105 is positioned on the rear side, and the retard path 105 extends to a position higher than the advance path 100. Between the outer wall and the inner wall of the cam chain chamber 58, the advance path 100 and the retard path 105 pass through the pair of oil pipes 64 and 65 and extend in a direction orthogonal to the cylinder axis. Accordingly, the pair of oil pipes 64 and 65 form crossing points of the advance path 100 and the retard path 105.

In the inner wall of the cam chain chamber 58, the advance path 100 and the retard path 105 extend from the outer wall of the cylinder head 26 toward the cam housing 91 in parallel with the cylinder axis. The advance path 100 passes through the lower housing 93 and extends to a mating surface 151 between the lower housing 93 and the upper housing 92, and then passes through the mating surface 151, and is connected to an advance groove 131 laterally. The retard path 105 passes through a mating surface 152 between the cylinder head 26 and the lower housing 93 and extends below a retard groove 132, and then passes through the lower housing 93, and is connected to the retard groove 132 from below. The advance groove 131 and the retard groove 132 are connected to the variable valve device 60 through the intake side camshaft 72.

The advance path 100 and the retard path 105 are formed in the cylinder 25 and the cylinder head 26 by a straight path parallel to the cylinder axis and an orthogonal path perpendicular to the straight path. Therefore, the pressure loss of the oil in the advance path and the retard path 105 is reduced, and the advance path 100 and the retard path 105 can be easily processed with respect to the cylinder 25 and the cylinder head 26. In the cylinder 25 and the cylinder head 26, the advance path 100 and the retard path 105 are arranged in parallel. Therefore, the advance path 100 and the retard path 105 are brought closer in a front-rear direction, and an increase in the size of the engine 21 is suppressed.

A drain hole 109 (see, in particular, FIG. 10) communicating with the drain port 54 (see FIG. 4B) of the oil control valve 40 is formed on the cylinder 25 side of the outer wall of the cam chain chamber 58. An inner peripheral surface of the cam chain 59 is positioned below the drain hole 109, and the oil is discharged from the drain hole 109 toward the cam chain 59. The oil dropped from the drain hole 109 is supplied to the cam chain 59, and a meshing location between the cam chain 59 and the intake side cam sprocket 71 and a meshing location between the cam chain 59 and the exhaust side cam sprocket 81 are properly lubricated, and durability of the cam chain 59 is improved. No guide or complicated processing for directing the oil to the cam chain 59 is required.

Figure 6:
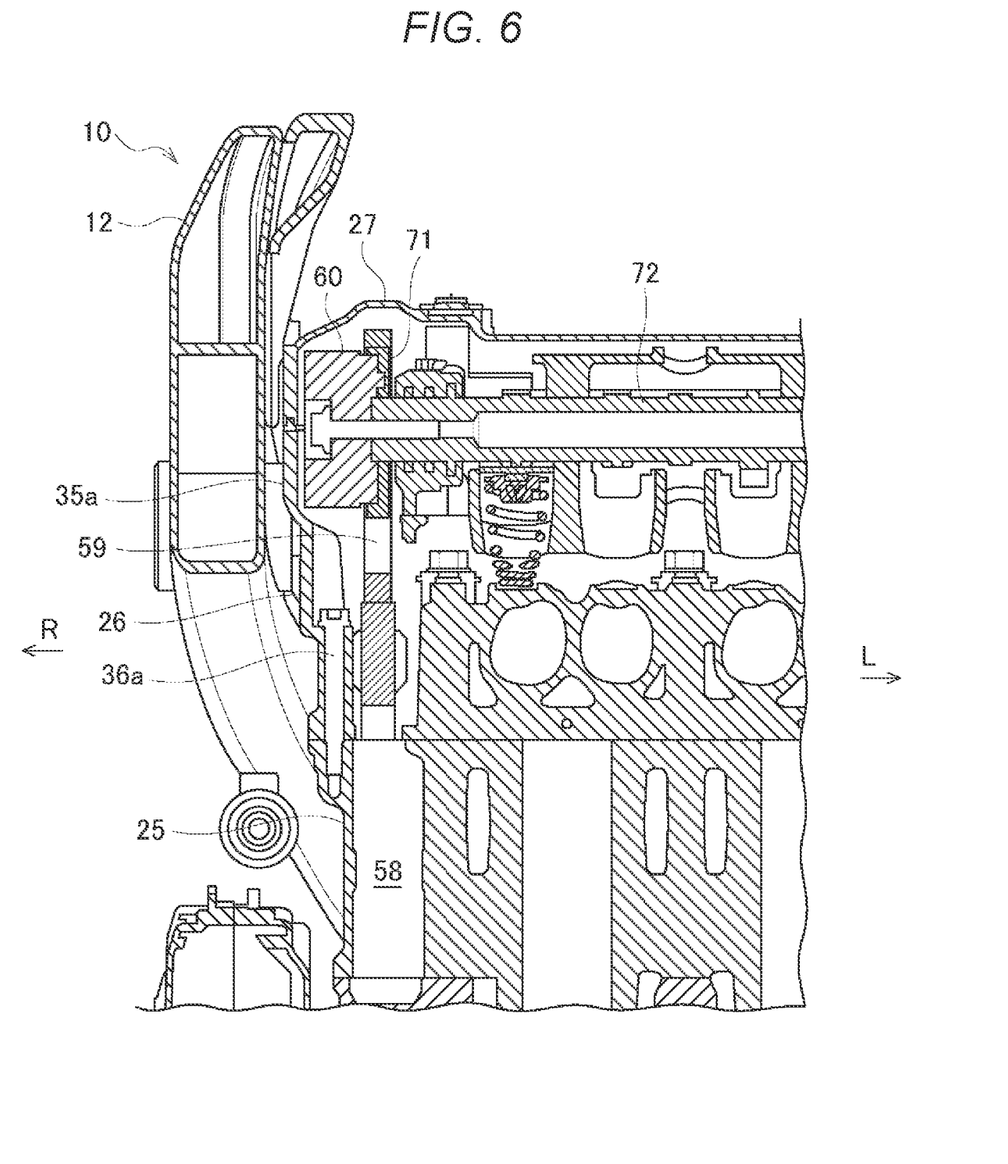
FIG. 6 is a cross-sectional view of the engine in FIG. 2 taken along a line A-A.
Figure 7:
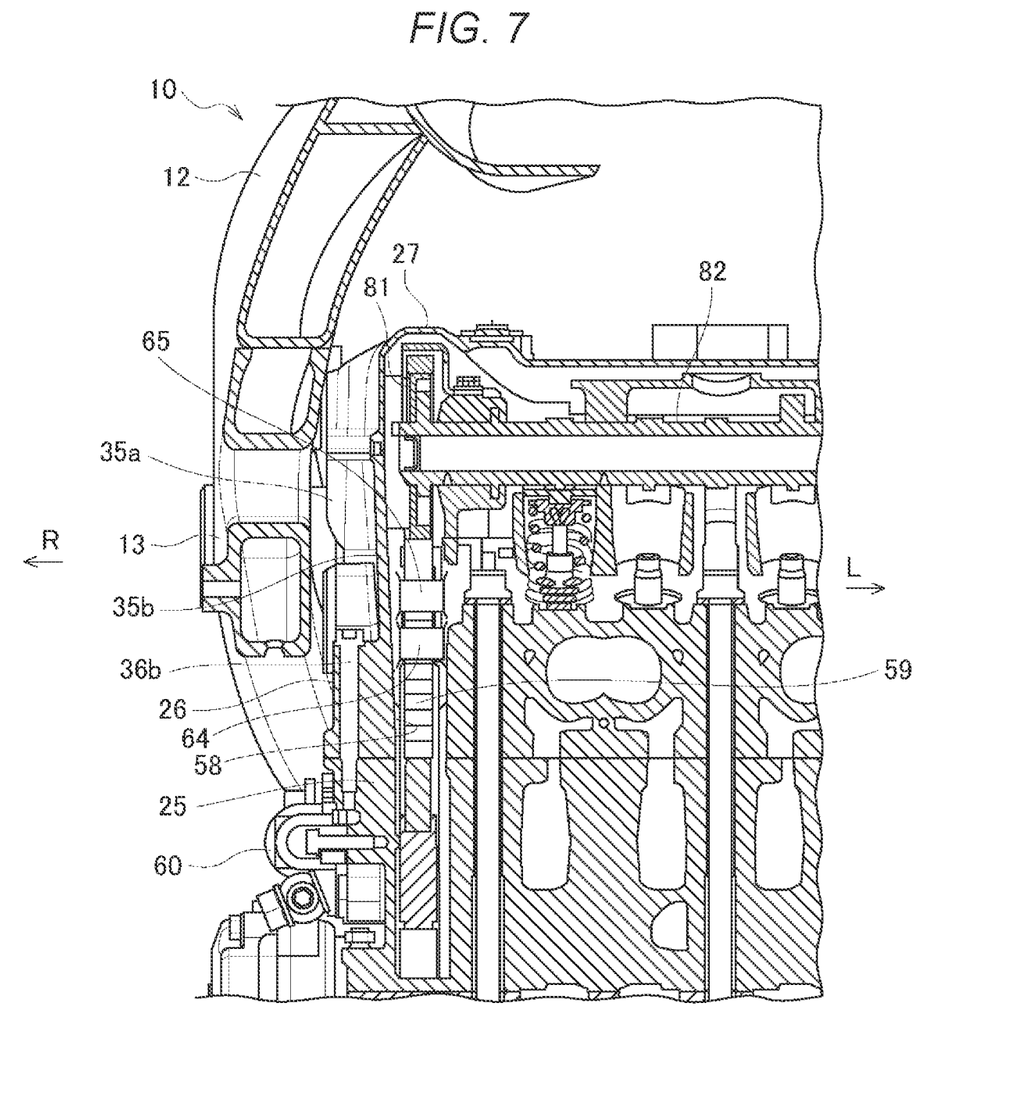
FIG. 7 is a cross-sectional view of the engine in FIG. 2 taken along a line B-B.
Figure 8:
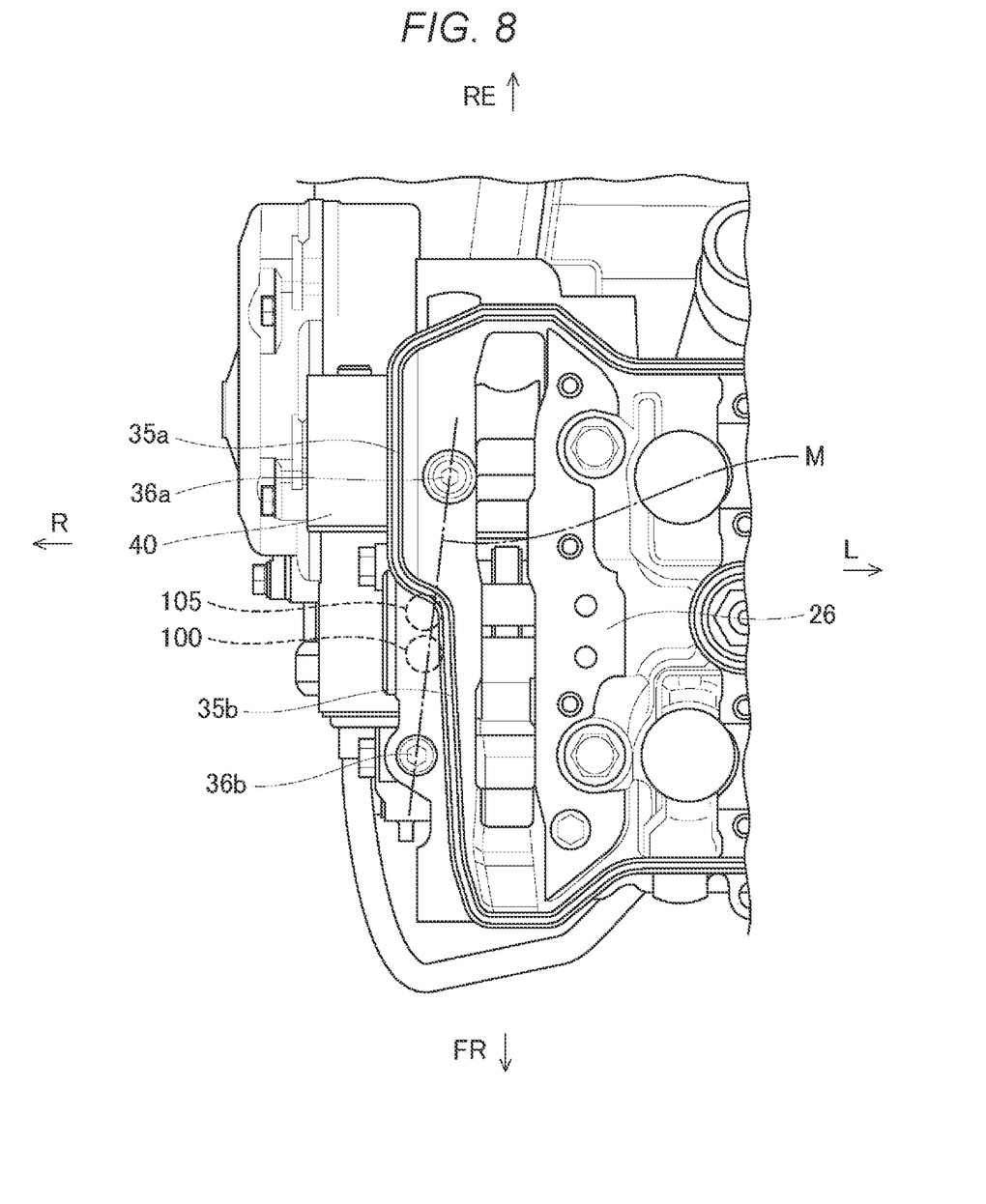
FIG. 8 is a top view of a cylinder head according to the present embodiment.
Figure 9:
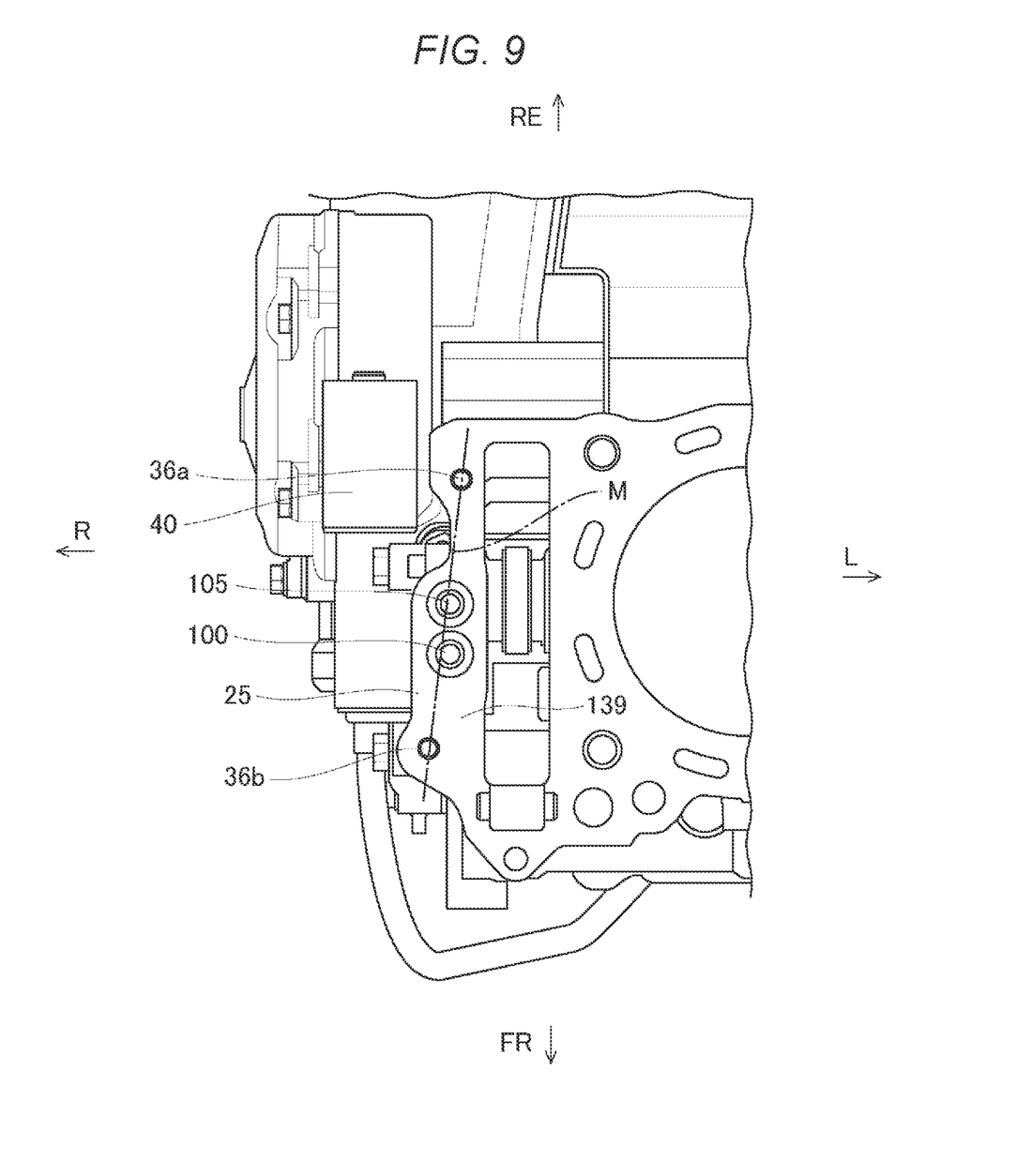
FIG. 9 is a top view of a cylinder according to the present embodiment.

Hereinafter, disposing structures of the first and second bolts will be described with reference to FIGS. 6 to 9. FIG. 6 is a cross-sectional view of the engine in FIG. 2 taken along a line A-A. FIG. 7 is a cross-sectional view of the engine in FIG. 2 taken along a line B-B. FIG. 8 is a top view of the cylinder head according to the present embodiment. FIG. 9 is a top view of the cylinder according to the present embodiment. In FIG. 8, the variable valve device and the camshafts are omitted for convenience of description.

As shown in FIGS. 6 and 7, the intake side camshaft 72 and the exhaust side camshaft are disposed at the cylinder head 26. In the side view of the vehicle shown in FIG. 2, a rear side of the vehicle where the intake side camshaft 72 is disposed is an intake side of the cylinder head 26, and a front side of the vehicle where the exhaust side camshaft 82 is disposed is an exhaust side of the cylinder head 26. As described above, the main frame 12 laterally covers the intake side which is the rear side of the cylinder head 26, and the down frame 13 laterally covers the exhaust side which is the front side of the cylinder head 26.

The intake side cam sprocket 71 and the variable valve device 60 are attached to the one end portion of the intake side camshaft 72, and the exhaust side cam sprocket 81 is attached to one end portion of the exhaust side camshaft 82. The accommodating walls 35a and 35b are formed on one side (right side) in the vehicle width direction of the cylinder head 26 and the cylinder head cover 27 to cover the intake side camshaft 72 and the exhaust side camshaft 82 from a side. In this case, since the variable valve device 60 is not attached to the exhaust side cam sprocket 81, the accommodating wall 35b on the exhaust side of the cylinder head 26 is located more inward in the vehicle width direction than the accommodating wall 35a on the intake side of the cylinder head 26.

As shown in FIG. 6, on the intake side of the cylinder head 26, the accommodating wall 35a of the cylinder head 26 and the cylinder head cover 27 protrudes outward in the vehicle width direction to accommodate the variable valve device 60. Although the accommodating wall 35a of the cylinder head 26 protrudes, the main frame 12 expands outward in the vehicle width direction, and interference between the accommodating wall 35a of the cylinder head 26 and the main frame 12 is suppressed. The first bolt 36a that fixes the intake side of the cylinder head 26 to the cylinder 25 is disposed more inward in the vehicle width direction than the accommodating wall 35a on the intake side, and a tool line for tightening the first bolt 36a is secured.

More specifically, the first bolt 36a is disposed below the variable valve device 60 and on the outer wall of the cam chain chamber 58 of the cylinder head 26. In this case, the accommodating wall 35a on the intake side of the cylinder head 26 protrudes outward in the vehicle width direction, so that a seating surface for the first bolt 36a is formed inside the accommodating wall 35a and on an upper portion of the outer wall of the cam chain chamber 58. A female screw extending vertically is formed in the seating surface, and the first bolt 36a can be tightened from above to the female screw (see FIG. 8). There is no obstacle when machining the female screw in the outer wall of the cam chain chamber 58 of the cylinder head from above, which facilitates machining.

As shown in FIG. 7, on the exhaust side of the cylinder head 26, the accommodating wall 35b of the cylinder head 26 and the cylinder head cover 27 does not protrude outward in the vehicle width direction. Although the down frame 13 is brought close to the cylinder head 26, a distance is secured between the down frame 13 and the accommodating wall 35b of the cylinder head 26, and interference between the accommodating wall 35b of the cylinder head and the down frame 13 is suppressed. The second bolt 36b that fixes the exhaust side of the cylinder head 26 to the cylinder 25 is disposed more outward in the vehicle width direction than the accommodating wall 35b on the exhaust side, and a tool line for tightening the second bolt 36b is secured.

More specifically, the second bolt 36b is disposed on the outer wall of the cam chain chamber 58 protruding out of the cylinder head 26. In this case, the accommodating wall 35b on the exhaust side of the cylinder head 26 is recessed inward in the vehicle width direction, so that a seating surface for the second bolt 36b is formed outside the accommodating wall 35b and on the upper portion of the outer wall of the cam chain chamber 58. A female screw extending vertically is formed in the seating surface, and the second bolt 36b can be tightened from above to the female screw (see FIG. 8). There is no obstacle when machining the female screw in the outer wall of the cam chain chamber 58 of the cylinder head 26 from above, which facilitates machining.

In the front view of the vehicle, the outer wall of the cam chain chamber 58 protrudes outward in the vehicle width direction on the exhaust side of the cylinder head 26, but an amount of protrusion is minimized to an extent that the second bolt 36b can be disposed. The second bolt 36b is positioned more inward in the vehicle width direction than the accommodating wall 35a on the intake side of the cylinder head 26 and between the accommodating wall 35b on the exhaust side of the cylinder head 26 and the down frame 13. Therefore, even if the cylinder head 26 is suspended by the down frame 13, the accommodating wall 35b on the exhaust side of the cylinder head 26 can be brought close to the down frame 13, and the increase in the size of the vehicle can be suppressed.

As shown in FIG. 8, the second bolt 36b is disposed below the exhaust side camshaft (see FIG. 7) and disposed more outward in the vehicle width direction than the first bolt 36a. The second bolt 36b is located more inward in the vehicle width direction than the accommodating wall 35*a* on the intake side, and the accommodating wall 35*b* on the exhaust side is located more inward in the vehicle width direction than the second bolt 36*b*, and thus the accommodating wall 35*b* on the exhaust side can be brought inward in the vehicle width direction. That is, the accommodating wall 35*b* on the exhaust side can be recessed relative to the accommodating wall 35*a* on the intake side. The vehicle body frame 10 (see FIG. 7) can be brought close to the accommodating wall 35*b* on the exhaust side, and the increase in the size of the vehicle can be suppressed.

As shown in FIGS. 8 and 9, the advance path 100 and the retard path 105 pass between the first bolt 36*a* and the second bolt 36*b* and extend from the oil control valve 40 toward the variable valve device 60 (see FIG. 6). In this case, the advance path 100 and the retard path 105 are located on a straight line M connecting centers of the first bolt 36*a* and the second bolt 36*b*. In the present embodiment, the straight line M crosses positions outside of the centers of the advance path 100 and the retard path 105. Accordingly, around the advance path 100 and the retard path 105, a surface pressure of a mating surface 139 between the cylinder head 26 and the cylinder 25 is increased to suppress oil leakage.

The variable valve timing system will be described with reference to FIG. 10. FIG. is a schematic view of the variable valve timing system according to the present embodiment.

Figure 10:
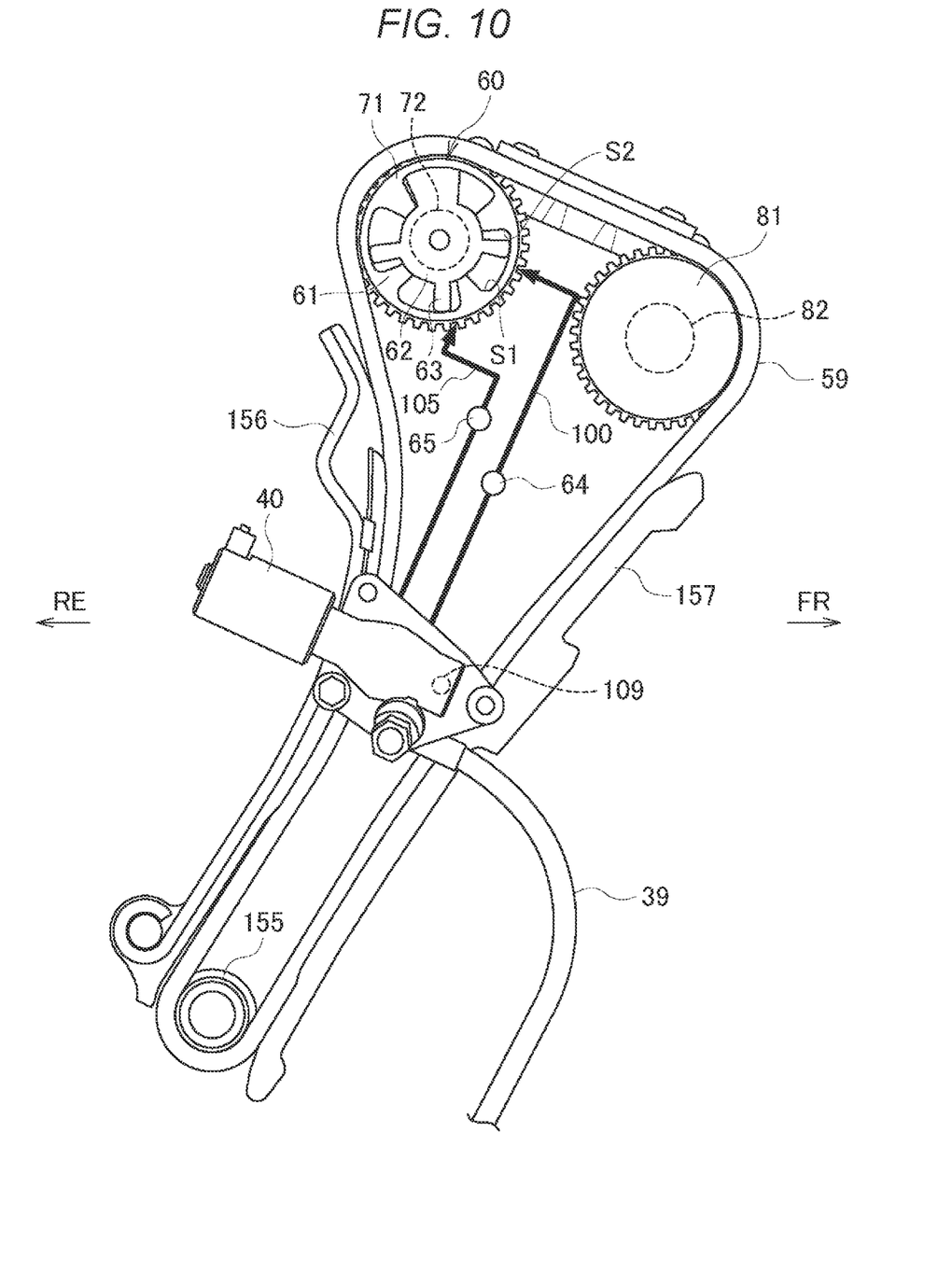
FIG. 10 is a schematic view of a variable valve timing system according to the present embodiment.

As shown in FIG. 10, a drive gear 155 for the cam chain 59 is provided below the oil control valve 40. A crankshaft (not shown) is connected to the drive gear 155 via a gear train. A lower portion of the cam chain 59 is wound around the drive gear 155, and an upper portion of the cam chain 59 is wound around the intake side cam sprocket 71 and the exhaust side cam sprocket 81. As the drive gear 155 rotates and the cam chain 59 rotates in a circle, the intake side camshaft 72 rotates integrally with the intake side cam sprocket 71, and the exhaust side camshaft 82 is rotated integrally with the exhaust side cam sprocket 81.

The cam chain 59 is guided by a lever guide 156 and a chain guide 157. The cam chain 59 sent from the drive gear 155 to the intake side cam sprocket 71 is guided by the lever guide 156, and the cam chain 59 drawn to the drive gear 155 from the exhaust side cam sprocket is guided by the chain guide 157. The cam chain 59 extending from the drive gear 155 to the intake side cam sprocket 71 becomes loose, and thus a chain tensioner (not shown) presses the lever guide 156 against the cam chain 59 to give tension to the cam chain 59.

The intake valve and an exhaust valve are opened and closed by the rotation of the intake side camshaft 72 and the exhaust side camshaft 82, but the opening and closing timing of the intake valve is changed by the variable valve timing system. The variable valve timing system is provided with the variable valve device 60 which changes a relative rotational phase of the intake side camshaft 72 with respect to the crankshaft. The variable valve device 60 includes a case 61 fixed to the intake side cam sprocket 71 and an inner rotor 62 fixed to the intake side camshaft 72. The inner rotor 62 is accommodated inside the case 61 in a relatively rotatable manner.

A plurality of hydraulic pressure chambers are formed in the case 61 of the variable valve device 60, and a plurality of vanes 63 extend radially outward from the inner rotor 62. The vane 63 of the inner rotor 62 is accommodated in each of the hydraulic pressure chambers of the case 61, and each of the hydraulic pressure chambers is partitioned by the vane 63 into the advance chamber S1 and the retard chamber S2. When a volume of the advance chamber S1 is increased according to the hydraulic pressure, the inner rotor 62 is rotated to an advance side relative to the case 61, and the intake side camshaft 72 is advanced. When a volume of the retard chamber S2 is increased according to the hydraulic pressure, the inner rotor 62 is rotated to a retard side relative to the case 61, and the intake side camshaft 72 is retarded.

The variable valve device 60 is operated according to the hydraulic pressure from the oil control valve 40. The oil is supplied to the oil control valve 40 from the main gallery 38 (see FIG. 2) through the external pipe 39. According to a communication state between the ports of the oil control valve 40, an oil supply destination from the oil control valve 40 is switched between the advance chamber S1 and the retard chamber S2 of the variable valve device 60. The oil is supplied from the oil control valve 40 through the advance path 100 to the advance chamber S1, and the oil is supplied from the oil control valve 40 through the retard path 105 to the retard chamber S2.

As described above, the advance path 100 and the retard path 105 cross the cam chain chamber 58 (see FIG. 7), and the oil pipes 64 and 65 are used to cross the cam chain chamber 58. The oil pipes 64 and 65 are disposed inside the cam chain 59 between the lever guide 156 and the chain guide 157. The oil pipes 64 and 65 are arranged in the front-rear direction while being separated from each other in the up-down direction, and the disposing area of the oil pipes 64 and 65 is narrowed, and the oil pipes 64 and 65 are disposed inside the cam chain 59 with ample space. When the cam chain 59 is pushed by the lever guide 156, the cam chain 59 does not interfere with the oil pipes 64 and 65.

According to the present embodiment, the accommodating wall 35*a* on the intake side of the cylinder head 26 protrudes outward in the vehicle width direction to accommodate the variable valve device 60, and the tool line for tightening the first bolt 36*a* is secured inside the protruding accommodating wall 35*a*. In addition, protrusion of the accommodating wall 35*b* on the exhaust side of the cylinder head 26 is suppressed to avoid interference with the vehicle body frame 10, and the tool line for tightening the second bolt 36*b* is secured at an outer side of the accommodating wall 35*b* whose protrusion is suppressed. Accordingly, the vehicle body frame 10 does not expand outward in the vehicle width direction and the increase in the size of the vehicle is suppressed, and a tool line at the time of fixing the cylinder head 26 to the cylinder 25 can be secured.

In the present embodiment, the parallel 4-cylinder engine is exemplified as the engine, but the type of the engine is not particularly limited.

In the present embodiment, a twin spar frame is exemplified as the vehicle body frame, but the type of vehicle body frame is not particularly limited as long as the vehicle body frame can suspend the cylinder head. For example, the vehicle body frame may be a cradle frame.

In the present embodiment, the oil control valve is disposed on a right side surface of the engine, but the oil control valve may be disposed on a left side surface of the engine.

In the present embodiment, the solenoid valve is used as an example of the oil control valve, but the type of the oil control valve is not particularly limited as long as the oil control valve is a valve that can control the hydraulic pressure with respect to the variable valve device.

In the present embodiment, the oil control valve and the main gallery are connected by the external pipe, but the oil control valve and the main gallery may be connected by the oil path inside the engine.

In the present embodiment, the detachable oil pipe forms a crossing path in the cam chain chamber, but the crossing path in the cam chain chamber may be formed so as to allow the oil to move between the inner wall and the outer wall of the cam chain chamber. For example, one of the inner wall and the outer walls of the cylinder head may protrude toward the other to form the crossing path.

In the present embodiment, the second bolt is positioned more outward in the vehicle width direction than the first bolt, and the straight line connecting the centers of the first bolt and the second bolt is inclined, but the first bolt and the second bolt may be positioned at the same position in the vehicle width direction. In this case, the straight line connecting the centers of the first bolt and the second bolt may cross the centers of the advance path and the retard path, and the straight line connecting the centers of the first bolt and the second bolt may cross positions out of centers of the advance path and the retard path.

In the present embodiment, the advance path and the retard path are positioned on the straight line connecting the centers of the first bolt and the second bolt, but if the advance path and the retard path are positioned between the first bolt and the second bolt, the surface pressure of the mating surface between the cylinder head and the cylinder can be sufficiently increased.

In the present embodiment, a size of the first bolt and a size of the second bolt are formed to be the same, but the size of the second bolt may be formed to be larger than the size of the first bolt. By setting the size of the second bolt larger, the surface pressure of the mating surface between the cylinder head and the cylinder can be increased.

In the present embodiment, the advance path and the retard path are partially formed in parallel, but the advance path and the retard path may be formed entirely non-parallel if the size of the engine is large enough.

In the present embodiment, the oil control valve is disposed so as not to overlap with the second bolt on the outer surface of the cylinder, but the oil control valve may overlap with the second bolt if the oil control valve does not protrude excessively from the outer surface of the engine.

In the present embodiment, the oil pipe and the plug cap are formed separately, but the oil pipe and the plug cap may be formed integrally.

In the present embodiment, the external pipe is positioned inside the engine cover and the down frames in the vehicle width direction, but the external pipe may be positioned outside the engine cover and the down frames in the vehicle width direction.

In the present embodiment, an area surrounded by the main frame, the down frame, and the lower surface of the cylinder head is formed in a substantially triangle shape, but the shape of the area surrounded by the main frame, the down frame, and the lower surface of the cylinder head is not particularly limited.

The variable valve timing system may be applied not only to the shown straddle-type vehicle but also other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, the variable valve timing system according to the present embodiment is a variable valve timing system for an engine (21) in which a cylinder head (26) on a cylinder (25) is suspended on a vehicle body frame (10), the variable valve timing system including: an intake side camshaft and an exhaust side camshaft (72 and 82) disposed on the cylinder head; and a variable valve device (60) attached to one end portion of the intake side camshaft. In a side view of a vehicle, when a side where the intake side camshaft is disposed is defined as an intake side of the cylinder head, and a side where the exhaust side camshaft is disposed is defined as an exhaust side of the cylinder head, in accommodating walls of the cylinder head which cover the intake side camshaft and the exhaust side camshaft from a side, the accommodating wall (35b) on the exhaust side is positioned more inward in a vehicle width direction than the accommodating wall (35a) on the intake side. A first bolt (36a) for fixing the intake side of the cylinder head to the cylinder is disposed more inward in the vehicle width direction than the accommodating wall on the intake side. A second bolt (36b) for fixing the exhaust side of the cylinder head to the cylinder is disposed more outward in the vehicle width direction than the accommodating wall on the exhaust side. According to the configuration, the accommodating wall on the intake side of the cylinder head protrudes outward in the vehicle width direction to accommodate the variable valve device, and a tool line for tightening the first bolt is secured inside the protruding accommodating wall. In addition, protrusion of the accommodating wall on the exhaust side of the cylinder head is suppressed to avoid interference with the vehicle body frame, and a tool line for tightening the second bolt is secured at the outer side of the accommodating wall whose protrusion is suppressed. Accordingly, the vehicle body frame does not expand outward in the vehicle width direction and an increase in a size of the vehicle is suppressed, and a tool line at the time of fixing the cylinder head to the cylinder can be secured.

In the variable valve timing system according to the present embodiment, the second bolt is disposed below the exhaust side camshaft and disposed more outward in the vehicle width direction than the first bolt. According to the configuration, the accommodating wall on the exhaust side can be brought inward in the vehicle width direction, the vehicle body frame can be brought close to the accommodating wall on the exhaust side, and the increase in the size of the vehicle can be suppressed.

In the variable valve timing system according to the present embodiment, the vehicle body frame includes a main frame (12) configured to laterally cover the intake side of the cylinder head and a down frame (13) configured to laterally cover the exhaust side of the cylinder head, and in a front view of the vehicle, the second bolt is positioned more inward in the vehicle width direction than the accommodating wall on the intake side and between the accommodating wall on the exhaust side and the down frame. According to the configuration, even if the cylinder head is suspended by the down frame, the accommodating wall on the exhaust side of the cylinder head can be brought close to the down frame, and the increase in the size of the vehicle can be suppressed.

The variable valve timing system according to the present embodiment includes an oil control valve (40) configured to control a hydraulic pressure with respect to the variable valve device, the oil control valve is disposed on an outer wall of the cylinder, and a part of the oil control valve is positioned below the second bolt. According to the configuration, in order to avoid interference between the second bolt and the oil control valve, the oil control valve is not required to protrude outward in the vehicle width direction, and the increase in the size of the engine is suppressed. The oil control valve is disposed at the cylinder, so that the vehicle body frame is separated from the oil control valve, the degree of freedom in a shape of the vehicle body frame is improved, and the vehicle body frame does not expand outward in the vehicle width direction, thereby suppressing the increase in the size of the vehicle.

The variable valve timing system according to the present embodiment includes an oil control valve configured to control a hydraulic pressure with respect to the variable valve device, and an oil path (100 and 105) for hydraulic pressure control passes between the first bolt and the second bolt and extends from the oil control valve to the variable valve device. According to the configuration, oil leakage can be suppressed by increasing a surface pressure of a mating surface between the cylinder and the cylinder head around the oil path.

In the variable valve timing system according to the present embodiment, the oil path is positioned on a straight line (M) connecting centers of the first bolt and the second bolt. According to the configuration, the surface pressure of the mating surface between the cylinder and the cylinder head can be further increased around the oil path.

Although the present embodiment has been described, a part or all of the above-described embodiment and modification may be combined as another embodiment.

The technique of the present invention is not limited to the above-described embodiment, and various changes, substitutions, and modifications may be made without departing from the spirit of the technical concept. The present invention may be implemented by other methods as long as the technical concept can be implemented by the methods through advance of the technique or other derivative techniques. Therefore, the claims cover all embodiments that may be included within the scope of the technical concept.

What is claimed is:

1. A variable valve timing system for an engine in which a cylinder head on a cylinder is suspended on a vehicle body frame, the variable valve timing system comprising:
    an intake side camshaft and an exhaust side camshaft disposed on the cylinder head; and
    a variable valve device attached to one end portion of the intake side camshaft, wherein
    in a side view of a vehicle, when a side where the intake side camshaft is disposed is defined as an intake side of the cylinder head, and a side where the exhaust side camshaft is disposed is defined as an exhaust side of the cylinder head, in accommodating walls of the cylinder head which cover the intake side camshaft and the exhaust side camshaft from a side, the accommodating wall on the exhaust side is positioned more inward in a vehicle width direction than the accommodating wall on the intake side,
    a first bolt for fixing the intake side of the cylinder head to the cylinder is disposed more inward in the vehicle width direction than the accommodating wall on the intake side, and
    a second bolt for fixing the exhaust side of the cylinder head to the cylinder is disposed more outward in the vehicle width direction than the accommodating wall on the exhaust side.

2. The variable valve timing system according to claim 1, wherein
    the second bolt is disposed below the exhaust side camshaft and disposed more outward in the vehicle width direction than the first bolt.

3. The variable valve timing system according to claim 1, wherein
    the vehicle body frame includes a main frame configured to laterally cover the intake side of the cylinder head and a down frame configured to laterally cover the exhaust side of the cylinder head, and
    in a front view of the vehicle, the second bolt is positioned more inward in the vehicle width direction than the accommodating wall on the intake side and between the accommodating wall on the exhaust side and the down frame.

4. The variable valve timing system according to claim 1, comprising:
    an oil control valve configured to control a hydraulic pressure with respect to the variable valve device, wherein
    the oil control valve is disposed on an outer wall of the cylinder, and
    a part of the oil control valve is positioned below the second bolt.

5. The variable valve timing system according to claim 1, comprising:
    an oil control valve configured to control a hydraulic pressure with respect to the variable valve device, wherein
    an oil path for hydraulic pressure control passes between the first bolt and the second bolt and extends from the oil control valve to the variable valve device.

6. The variable valve timing system according to claim 5, wherein
    the oil path is positioned on a straight line connecting centers of the first bolt and the second bolt.

* * * * *